US012223890B2

(12) United States Patent
Xu

(10) Patent No.: US 12,223,890 B2
(45) Date of Patent: Feb. 11, 2025

(54) DRIVING METHOD FOR OLED DISPLAY PANEL, DRIVING APPARATUS FOR OLED DISPLAY PANEL, ELECTRONIC DEVICE, AND COMPUTER STORAGE MEDIUM

(71) Applicant: WUHAN TIANMA MICRO-ELECTRONICS CO., LTD., Wuhan (CN)

(72) Inventor: Mingxia Xu, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/333,652

(22) Filed: Jun. 13, 2023

(65) Prior Publication Data

US 2023/0343283 A1 Oct. 26, 2023

(30) Foreign Application Priority Data

Oct. 11, 2022 (CN) ......................... 202211242924.3

(51) Int. Cl.
*G09G 3/32* (2016.01)
*G09G 3/3208* (2016.01)

(52) U.S. Cl.
CPC ..................... *G09G 3/3208* (2013.01); *G09G 2300/0842* (2013.01); *G09G 2320/0257* (2013.01); *G09G 2320/0276* (2013.01)

(58) Field of Classification Search
CPC ......... G09G 3/3208; G09G 2300/0842; G09G 2320/0257; G09G 2320/0276; G09G 5/02;
(Continued)

(56) References Cited

U.S. PATENT DOCUMENTS

2006/0256141 A1* 11/2006 Maruyama ........... G09G 3/3688 345/690
2010/0164996 A1* 7/2010 Tomizawa ........... G09G 3/3648 345/213
(Continued)

FOREIGN PATENT DOCUMENTS

CN 113936598 A 1/2022

*Primary Examiner* — Abdul-Samad A Adediran
(74) *Attorney, Agent, or Firm* — CHRISTENSEN O'CONNOR JOHNSON KINDNESS PLLC

(57) ABSTRACT

A driving method and apparatus, an electronic device, and a storage medium, which ameliorate smearing when image switching are described. In an embodiment, a driving method for an organic light-emitting diode (OLED) display panel includes: correcting, if a current display brightness value of the OLED display panel is below a brightness threshold, grayscale data of an $N^{th}$ frame to obtain corrected grayscale data of the $N^{th}$ frame; obtaining a compensation value of an $(N+1)^{th}$ frame according to grayscale data of the $(N+1)^{th}$ frame and the corrected grayscale data of the $N^{th}$ frame; performing compensation according to the compensation value of the $(N+1)^{th}$ frame and the grayscale data of the $(N+1)^{th}$ frame to obtain compensated grayscale data of the $(N+1)^{th}$ frame; and outputting the compensated grayscale data of the $(N+1)^{th}$ frame to the OLED display panel.

14 Claims, 7 Drawing Sheets

(58) Field of Classification Search
CPC ............... G09G 3/3648; G09G 3/3688; G09G 3/3233; G09G 3/36; G09G 3/2007
USPC .................................................. 345/213, 690
See application file for complete search history.

(56) References Cited

U.S. PATENT DOCUMENTS

| | | | | |
|---|---|---|---|---|
| 2019/0182509 | A1* | 6/2019 | Kim | G09G 5/02 |
| 2022/0343825 | A1* | 10/2022 | Ha | G09G 3/2007 |
| 2022/0383805 | A1* | 12/2022 | Lee | G09G 3/3233 |
| 2024/0038134 | A1* | 2/2024 | Bae | G09G 3/36 |

* cited by examiner

DRIVING METHOD FOR OLED DISPLAY PANEL, DRIVING APPARATUS FOR OLED DISPLAY PANEL, ELECTRONIC DEVICE, AND COMPUTER STORAGE MEDIUM

CROSS-REFERENCE TO RELATED APPLICATIONS

The present application claims priority to Chinese Patent Application No. 202211242924.3, filed on Oct. 11, 2022, the content of which is incorporated herein by reference in its entirety.

TECHNICAL FIELD

The present disclosure relates to the technical field of display, and in particular, to a driving method for an organic light-emitting diode (OLED) display panel, a driving apparatus for an OLED display panel, an electronic device, and a computer storage medium.

BACKGROUND

An organic light-emitting diode (OLED) display panel drives a pixel to emit light according to a voltage value acquired by a driver integrated circuit (IC). When each frame of image is displayed, the driver IC provides a voltage value corresponding to a current frame of image to the panel. In theory, a light-emitting grayscale value corresponds to the voltage value from the IC, in this way, the driver IC drives the panel to refresh display frame by frame.

However, when switching between some images, for example, when switching from a black image to a white image, a smearing phenomenon may occur.

SUMMARY

The present disclosure provides, in various aspects, a driving method and apparatus, an electronic device, and a storage medium, which can ameliorate smearing when image switching.

In a first aspect, a driving method for an OLED display panel is provided, the method including: correcting, if a current display brightness value (DBV) of the OLED display panel is below a brightness threshold, grayscale data of an $N^{th}$ frame to obtain corrected grayscale data of the $N^{th}$ frame; obtaining a compensation value of an $(N+1)^{th}$ frame according to grayscale data of the $(N+1)^{th}$ frame and the corrected grayscale data of the $N^{th}$ frame; performing compensation according to the compensation value of the $(N+1)^{th}$ frame and the grayscale data of the $(N+1)^{th}$ frame to obtain compensated grayscale data of the $(N+1)^{th}$ frame; and outputting the compensated grayscale data of the $(N+1)^{th}$ frame to the OLED display panel.

In a second aspect, the present disclosure provides a driving apparatus for an OLED display panel, the driving apparatus including: a correction module configured to correct, if a current DBV of the OLED display panel is below a brightness threshold, grayscale data of an $N^{th}$ frame to obtain corrected grayscale data of the $N^{th}$ frame; a determination module configured to obtain a compensation value of an $(N+1)^{th}$ frame according to grayscale data of the $(N+1)^{th}$ frame and the corrected grayscale data of the $N^{th}$ frame; a compensation module configured to perform compensation according to the compensation value of the $(N+1)^{th}$ frame and the grayscale data of the $(N+1)^{th}$ frame to obtain compensated grayscale data of the $(N+1)^{th}$ frame; and an output module configured to output the compensated grayscale data of the $(N+1)^{th}$ frame to the OLED display panel.

In a third aspect, the present disclosure provides a driving apparatus for an OLED display panel, the apparatus including: a processor and a memory, the memory being configured to store at least one instruction, the instruction being loaded and executed by the processor to implement the method described above.

In a fourth aspect, the present disclosure provides an electronic device, including: an OLED display panel and the driving apparatus for an OLED display panel described above.

In a fifth aspect, the present disclosure provides a computer storage medium, including computer instructions. In an embodiment, the computer instructions, when run in an electronic device, cause the electronic device to perform the method described above.

According to embodiments of the driving method and apparatus for an OLED display panel, the electronic device, and the storage medium in the embodiments of the present disclosure, when the current DBV of the OLED display panel is below the brightness threshold, the grayscale data of the $N^{th}$ frame is corrected, and the grayscale data of the $(N+1)^{th}$ frame is compensated according to corrected grayscale data of the $N^{th}$ frame. The corrected grayscale data of the $N^{th}$ frame is closer to actual grayscale data of the OLED display panel. Therefore, when the grayscale data of the $(N+1)^{th}$ frame is compensated, the compensation value is obtained according to the grayscale data of the $N^{th}$ frame closer to an actual value, so that the compensated grayscale data of the $(N+1)^{th}$ frame of the OLED display panel is closer to a theoretical value, thereby ameliorating a smearing phenomenon.

DESCRIPTION OF EMBODIMENTS

The terms used in detailed description of the present disclosure are merely intended to explain specific embodiments of the present disclosure, and are not intended to limit the present disclosure.

Prior to the description of embodiments of the present disclosure, the related art and issues in the related art are described first in the following.

For an OLED display panel, a driver IC outputs a grayscale voltage corresponding to each pixel to the display panel, and the pixel on the display panel is charged to the corresponding grayscale voltage and displays a corresponding grayscale. When switching between two adjacent frames of images with a large difference in grayscale values, for example, when switching from a black image to a white image, the driver IC instructs the panel to switch from a grayscale value of 0 to a grayscale value of 255, while the panel cannot respond in time to switch to a grayscale voltage of 255 and may actually switch to only a grayscale voltage of 150, resulting in smearing at the beginning of image switching in such a scenario.

Figure 1:
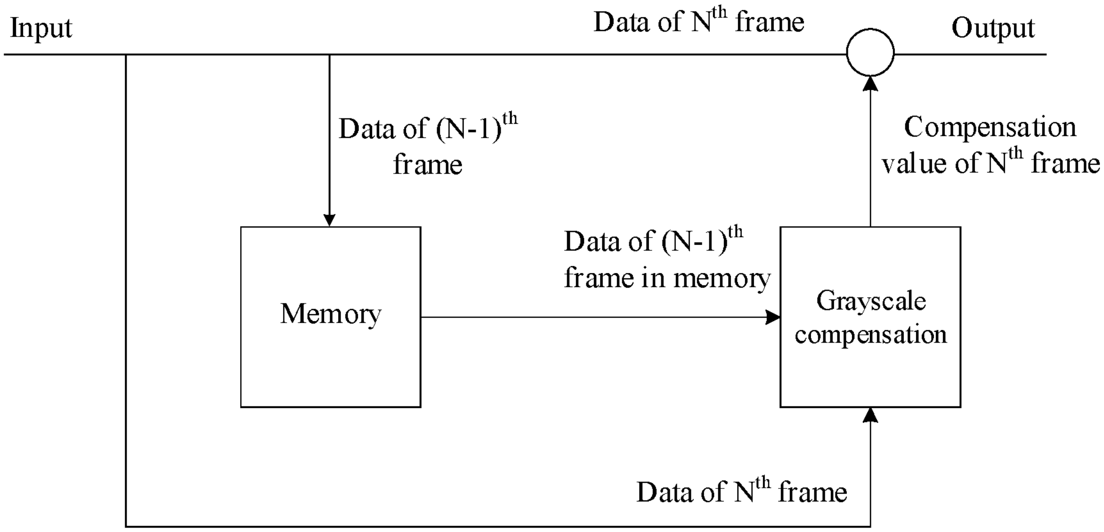
FIG. 1 (Prior art)
FIG. 1 is a schematic diagram of a driving process for an OLED display panel in the related art.

In order to ameliorate the smearing, in the related art, an image is compensated by overdrive. As shown in FIG. 1, in the driver IC, data of each frame of image may be stored in a memory for use in compensation for data of a next frame of image. The data of each frame (an $N^{th}$ frame) of image is compared with the data of a previous frame (an $(N-1)^{th}$ frame) of image, and a compensation value is determined according to a grayscale look up table (LUT). The greater a difference between the data of the $N^{th}$ frame and the data of the $(N-1)^{th}$ frame, the greater the compensation value. If there is no difference, the compensation value is 0. The obtained compensation value is superimposed onto the data of the $N^{th}$ frame and is then output to the panel. That is, the panel can perform displaying according to a greater grayscale than the theoretical value, so that a grayscale actually displayed by the panel is closer to the theoretical value.

At a high brightness, the smearing can be ameliorated with this method. However, at a low brightness, only the first frame after image switching can be compensated with this method, and in fact, the second frame and the third frame also have the problem that the grayscale value cannot reach an expected value. As a result, the smearing phenomenon still exists. For example, a grayscale value of an $M^{th}$ frame is 0, and grayscale values of $(M+1)^{th}$, $(M+2)^{th}$, and $(M+3)^{th}$ frames are 255. When switching from the $M^{th}$ frame to the $(M+1)^{th}$ frame, the $(M+1)^{th}$ frame is compensated by overdrive compensation. However, the $(M+1)^{th}$ frame of the panel actually reaches a grayscale voltage of 150, and a value stored in the memory is a theoretical value 255 of the $(M+1)^{th}$ frame. When the $(M+2)^{th}$ frame is processed, a compensation value may be obtained according to a difference between 255 of the $(M+2)^{th}$ frame and 255 of the $(M+1)^{th}$ frame by overdrive. In this case, since the two frames have the same theoretical value, no compensation is performed, which may result in that the panel may perform displaying according to an uncompensated theoretical value in response to the $(M+2)^{th}$ frame. However, in fact, a change from 150 to 255 is still quite a great change, which may still result in the grayscale voltage of the display panel cannot reach 255. For similar reasons, the $(M+3)^{th}$ frame also has such a problem, thereby leading to smearing.

In order to solve the above-mentioned problems, the technical solutions of the embodiments of the present disclosure are provided, and are described as follows.

Figure 2:
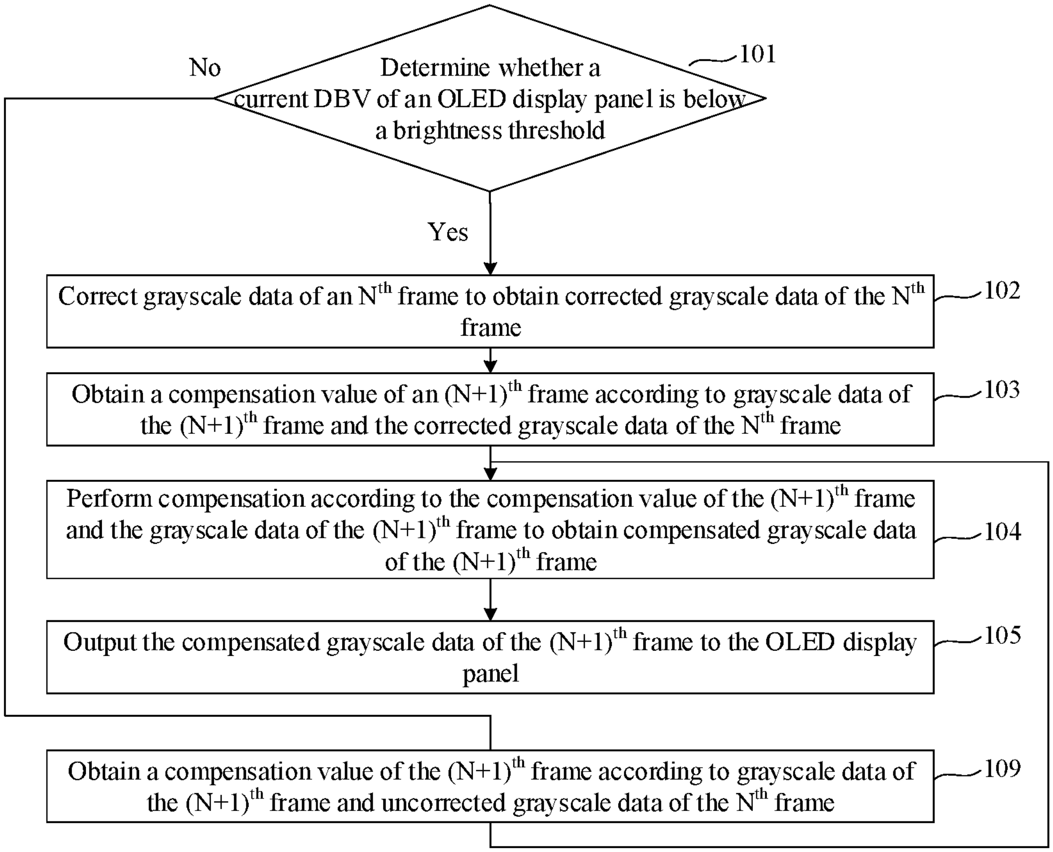
FIG. 2 is a schematic flowchart of a driving method for an OLED display panel according to an embodiment of the present disclosure.
Figure 3:
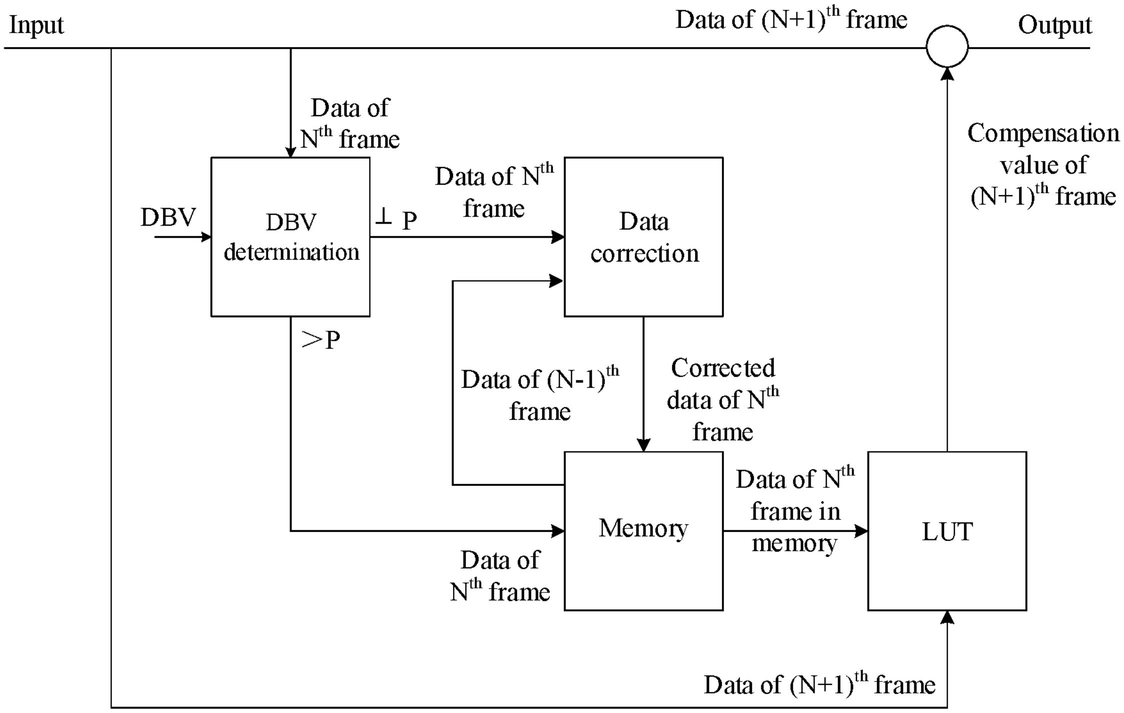
FIG. 3 is a schematic flowchart of another driving method for an OLED display panel according to an embodiment of the present disclosure.

As shown in FIG. 2 and FIG. 3, an embodiment of the present disclosure provides a driving method for an OLED display panel. The method can be applied to a driver IC. The method includes the following steps.

In step 101, it is determined whether a current display brightness value (DBV) of the OLED display panel is below a brightness threshold; and, if yes, step 102 is performed.

For an OLED display panel, only when a DBV is relatively low, smearing may occur because the grayscale voltages of three consecutive frames cannot be as expected. Therefore, the DBV is determined first. For example, the brightness threshold is P. Only if it is satisfied that the current DBV≤P (that is, the DBV is below the brightness threshold), subsequent steps 102 to 105 can be performed to ameliorate the problem of smearing of the three consecutive frames. If this condition is not satisfied, processing can be performed with the method in the related art. Details will be described in the following.

In step 102, grayscale data of an $N^{th}$ frame is corrected to obtain corrected grayscale data of the $N^{th}$ frame, so that the corrected grayscale data of the $N^{th}$ frame is closer to actual grayscale data of the OLED display panel.

In step 103, a compensation value of an $(N+1)^{th}$ frame is obtained according to grayscale data of the $(N+1)^{th}$ frame and the corrected grayscale data of the $N^{th}$ frame.

The grayscale data of the $(N+1)^{th}$ frame is compensated according to the corrected grayscale data of the $N^{th}$ frame, so the compensation value of the $(N+1)^{th}$ frame of the OLED display panel closer to an actual value can be obtained.

In step 104, compensation is performed according to the compensation value of the $(N+1)^{th}$ frame and the grayscale data of the $(N+1)^{th}$ frame, to obtain compensated grayscale data of the $(N+1)^{th}$ frame.

In step 105, the compensated grayscale data of the $(N+1)^{th}$ frame is output to the OLED display panel.

In an embodiment, for example, a grayscale value of the $(N-1)^{th}$ frame is 0, and grayscale values of the $N^{th}$ frame and the $(N+1)^{th}$ frame are 255. Although compensation is performed at the $N^{th}$ frame, an actual grayscale value of the $N^{th}$ frame of the OLED display panel still does not reach the expected value 255. Therefore, when driving according to the data of the $(N+1)^{th}$ frame, in step 102, the grayscale data of the $N^{th}$ frame is corrected, so that the grayscale data of the $N^{th}$ frame is closer to an actual grayscale value of the OLED display panel, and then the grayscale data of the $(N+1)^{th}$ frame is compensated according to the corrected grayscale data of the $N^{th}$ frame. In this way, it does not lead to a situation that compensation is not performed because each of the two values is 255. In fact, the grayscale data of the $(N+1)^{th}$ frame can be compensated according to the data of the $N^{th}$ frame closer to the actual value, so as to obtain a compensation value. In this way, the OLED display panel can also be driven according to the compensated grayscale data of the $(N+1)^{th}$ frame, so that the grayscale data of the $(N+1)^{th}$ frame of the OLED display panel is closer to the theoretical value 255, thereby ameliorating the smearing phenomenon.

According to the driving method for an OLED display panel in this embodiment of the present disclosure, when the current DBV of the OLED display panel is below the brightness threshold, the grayscale data of the $N^{th}$ frame is corrected, and the grayscale data of the $(N+1)^{th}$ frame is compensated according to corrected grayscale data of the $N^{th}$ frame. The corrected grayscale data of the $N^{th}$ frame is closer to actual grayscale data of the OLED display panel. Therefore, when the grayscale data of the $(N+1)^{th}$ frame is compensated, the compensation value is obtained according to the grayscale data of the $N^{th}$ frame closer to an actual value, so that the compensated grayscale data of the $(N+1)^{th}$ frame of the OLED display panel is closer to a theoretical value, thereby ameliorating a smearing phenomenon.

In an embodiment, in step 102, the process of correcting grayscale data of an $N^{th}$ frame to obtain corrected grayscale data of the $N^{th}$ frame includes: correcting data of the $N^{th}$ frame according to grayscale data of an $(N-1)^{th}$ frame to obtain the corrected grayscale data of the $N^{th}$ frame. In order to make the correction of the grayscale data of the $N^{th}$ frame more accurate, the data of the $N^{th}$ frame can be corrected according to the grayscale data of the $(N-1)^{th}$ frame, because the OLED display panel is charged from a grayscale voltage corresponding to the grayscale data of the $(N-1)^{th}$ frame to a grayscale voltage corresponding to the grayscale data of the $N^{th}$ frame.

In an embodiment, in step 102, the process of correcting data of the $N^{th}$ frame according to grayscale data of an $(N-1)^{th}$ frame to obtain the corrected grayscale data of the $N^{th}$ frame includes: correcting the grayscale data of the $N^{th}$ frame according to the grayscale data of the $(N-1)^{th}$ frame and the current DBV to obtain the corrected grayscale data of the $N^{th}$ frame. The charging of the OLED display panel is correlated with the current DBV. Therefore, the corrected data is more accurate if the grayscale data of the $N^{th}$ frame is corrected according to the current DBV.

In an embodiment, the process of correcting the grayscale data of the $N^{th}$ frame according to the grayscale data of the $(N-1)^{th}$ frame and the current DBV to obtain the corrected grayscale data of the $N^{th}$ frame includes: correcting the grayscale data of the $N^{th}$ frame according to the following formula to obtain the corrected grayscale data of the $N^{th}$ frame.

In an embodiment, $NewData_N = a*Data_{N-1}+(1-a)*Data_N$, where $Data_{N-1}$ denotes the grayscale data of the $(N-1)^{th}$ frame, $Data_N$ denotes the grayscale data of the $N^{th}$ frame, $NewData_N$ denotes the corrected grayscale data of the $N^{th}$ frame, a denotes a current weight value, a is correlated with G, $G=Data_N-Data_{N-1}$, $0 \le a \le 1$, and a is correlated with the current DBV.

In an embodiment, in the process of correcting the grayscale data of the $N^{th}$ frame, G is determined according to the grayscale data $Data_N$ of the $N^{th}$ frame and the grayscale data $Data_{N-1}$ of the $(N-1)^{th}$ frame, the current weight value a is determined according to G and the current DBV, and then the corrected grayscale data $NewData_N$ of the $N^{th}$ frame is calculated according to a, $Data_N$, and $Data_{N-1}$.

In an embodiment, a is determined according to a weight look up table (LUT). The weight LUT includes weight values arranged in rows and columns. The weight LUT further includes G binding points and DBV binding points. The G binding points correspond to the rows of weight values, respectively, and the DBV binding points correspond to the columns of weight values, respectively.

In an embodiment, for example, an example weight LUT is provided in Table 1.

TABLE 1

| | DBV | | | | |
|---|---|---|---|---|---|
| G | P1 | P2 | P3 | P4 | P5 |
| G1 | a1 | a2 | a3 | a4 | a5 |
| G2 | a6 | a7 | a8 | a9 | a10 |
| G3 | a11 | a12 | a13 | a14 | a15 |
| G4 | a16 | a17 | a18 | a19 | a20 |
| G5 | a21 | a22 | a23 | a24 | a25 |

As above in Table 1, the weight LUT includes weight values arranged in 5 rows and 5 columns. The weight values are a1 to a25. The weight LUT further includes G binding points G1 to G5 and DBV binding points P1 to P5. It is to be noted that data of red (R), green (G), and blue (B) channels may be the same with or different from each other in the weight LUT. Different channels may correspond to the same weight LUT. The different channels may also respectively correspond to three channels and have three different weight LUTs. If the current G and DBV are inputted to the corresponding binding points, the corresponding a can be determined directly through the LUT. If the current G or DBV is not at the binding point, the current weight a can be calculated by linear interpolation.

Figure 4:
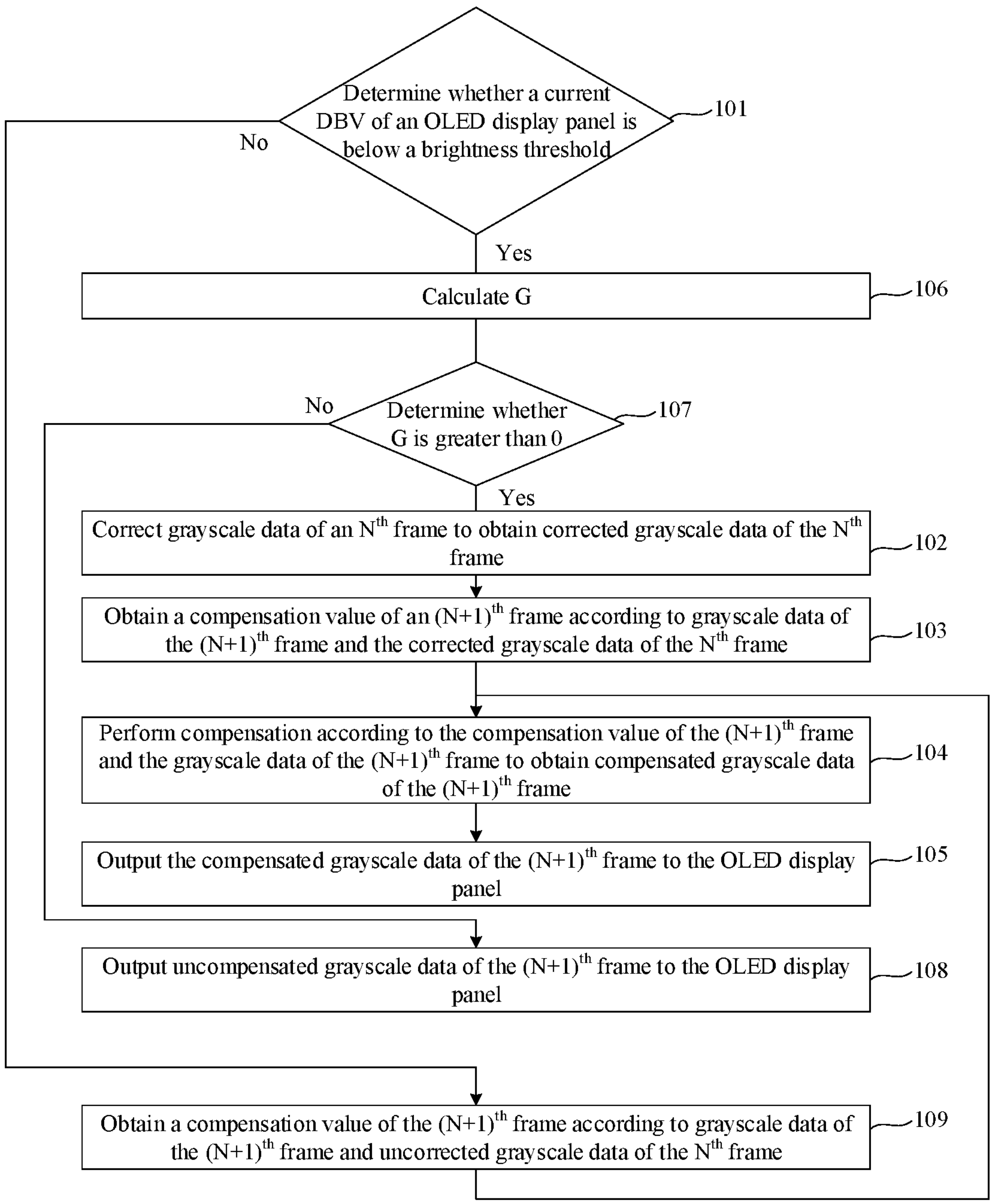
FIG. 4 is a schematic flowchart of another driving method for an OLED display panel according to an embodiment of the present disclosure.
Figure 5:
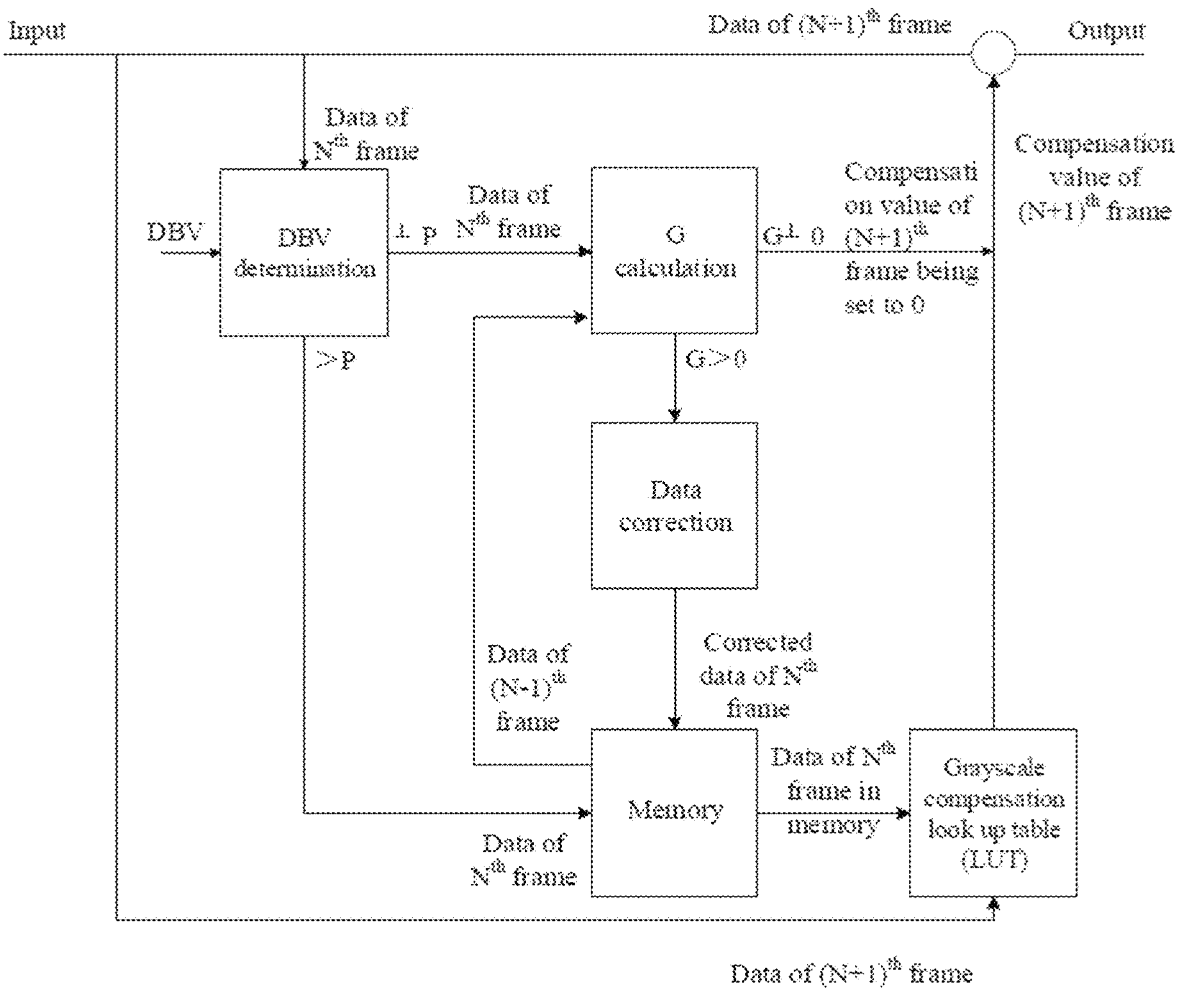
FIG. 5 is a schematic flowchart of another driving method for an OLED display panel according to an embodiment of the present disclosure.

In an embodiment, as shown in FIG. 4 and FIG. 5, prior to step 102, the method further includes: if the current DBV is below the brightness threshold, performing step 106 to calculate G, performing step 107 to determine whether G is greater than 0; and if yes, performing step 102, where $G=Data_N-Data_{N-1}$, $Data_{N-1}$ denotes the grayscale data of the $(N-1)^{th}$ frame, and $Data_N$ denotes the grayscale data of the $N^{th}$ frame.

In an embodiment, as shown in FIG. 4 and FIG. 5, if the current DBV is below the brightness threshold and $G \le 0$, step 108 is performed to output uncompensated grayscale data of the $(N+1)^{th}$ frame to the OLED display panel.

In an embodiment, the grayscale data of the $(N+1)^{th}$ frame is to be processed currently, that is, a compensation value of the grayscale data of the $(N+1)^{th}$ frame is required to be determined, so as to drive the OLED display panel through the compensated grayscale data of the $(N+1)^{th}$ frame. If $G>0$, it indicates that a grayscale value of the $N^{th}$ frame is greater than a grayscale value of the $(N-1)^{th}$ frame, which means that the $(N+1)^{th}$ frame is the second frame after switching to a scenario with increased brightness. For the grayscale data of the $(N+1)^{the}$ frame, a situation is required to be taken into account that the compensation for the $N^{th}$ frame cannot allow the OLED display panel to reach a theoretical grayscale value, so steps 102 to 105 are performed. If $G \le 0$, it indicates that the grayscale value of the $N^{th}$ frame is not greater than the grayscale value of the $(N-1)^{th}$ frame, which means that the $(N+1)^{th}$ frame is not the second frame after switching to a scenario with increased brightness and compensation is not required. Therefore, the compensation value of the $(N+1)^{th}$ frame can be directly set to 0, which is superimposed onto the grayscale data of the $(N+1)^{th}$ frame to actually obtain uncompensated grayscale data of the $(N+1)^{th}$ frame. That is, the uncompensated grayscale data of the $(N+1)^{th}$ frame is output to the OLED display panel.

In an embodiment, prior to the performing compensation according to the compensation value of the $(N+1)^{th}$ frame and the grayscale data of the $(N+1)^{th}$ frame, in step 101, if the current DBV is not below the brightness threshold, step 109 is performed to obtain the compensation value of the $(N+1)^{th}$ frame according to the grayscale data of the $(N+1)^{th}$ frame and uncorrected grayscale data of the $N^{th}$ frame, and then step 104 and step 105 may be performed to perform compensation according to the compensation value of the $(N+1)^{th}$ frame and drive the OLED display panel.

In an embodiment, the grayscale data of the $(N-1)^{th}$ frame is from a memory. The memory may be a random access memory (RAM). In other words, in step 102 or step 106, the grayscale data of the $(N-1)^{th}$ frame is required to be used, and the grayscale data of the $(N-1)^{th}$ frame may be read from the memory for use. Prior to the process of obtaining a compensation value of the $(N+1)^{th}$ frame according to grayscale data of the $(N+1)^{th}$ frame and the corrected grayscale data of the $N^{th}$ frame, the method further includes: storing, if the current DBV is below the brightness threshold and $G>0$, the corrected grayscale data of the $N^{th}$ frame into the memory to replace the grayscale data of the $(N-1)^{th}$ frame therein, $G=Data_N-Data_{N-1}$, where $Data_{N-1}$ denotes the grayscale data of the $(N-1)^{th}$ frame, and $Data_N$ denotes the grayscale data of the $N^{th}$ frame. In other words, in step 102, after the corrected grayscale data of the $N^{th}$ frame is obtained, the corrected grayscale data of the N$^{th}$ frame is stored into the memory to replace the grayscale data of the (N−1)$^{th}$ frame, so as to facilitate use in a subsequent compensation process.

In an embodiment, in fact, at each frame, new grayscale data may be stored into the memory to replace grayscale data of a previous frame. The process of outputting, if the current DBV is below the brightness threshold and $G \leq 0$, uncompensated grayscale data of the (N+)$^{th}$ frame to the OLED display panel includes: storing, if the current DBV is below the brightness threshold and $G \leq 0$, uncorrected grayscale data of the N$^{th}$ frame into the memory to replace the grayscale data of the (N−1)$^{th}$ frame therein, and outputting uncompensated grayscale data of the (N+1)$^{th}$ frame to the OLED display panel. In other words, in step 108, although the grayscale data of the (N+1)$^{th}$ frame is not compensated, the grayscale data of the N$^{th}$ frame is still stored into the memory to replace the grayscale data of the (N−1)$^{th}$ frame.

In an embodiment, prior to the process of obtaining a compensation value of an (N+1)$^{th}$ frame according to grayscale data of the (N+1)$^{th}$ frame and the corrected grayscale data of the N$^{th}$ frame, the method further includes: storing, if the current DBV is not below the brightness threshold, uncorrected grayscale data of the N$^{th}$ frame intro the memory to replace the grayscale data of the (N−1)$^{th}$ frame therein. In other words, in the step 109, step 104, and step 105, although compensation is not performed, the grayscale data of the N$^{th}$ frame is still required to be stored into the memory to replace the grayscale data of the (N−1)$^{th}$ frame.

In an embodiment, in step 103, the process of obtaining a compensation value of an (N+1)$^{th}$ frame according to grayscale data of the (N+1)$^{th}$ frame and the corrected grayscale data of the N$^{th}$ frame includes: obtaining a compensation value of the (N+1)$^{th}$ frame according to the grayscale data of the (N+1)$^{th}$ frame and current data in the memory.

In an embodiment, since the corrected grayscale data of the N$^{th}$ frame has been stored into the memory in step 102, the compensation value of the (N+1)$^{th}$ frame can be obtained in step 103 according to the grayscale data of the (N+1)$^{th}$ frame and corrected grayscale data of the N$^{th}$ frame in the memory.

In an embodiment, the process of obtaining the compensation value of the (N+1)$^{th}$ frame according to the grayscale data of the (N+1)$^{th}$ frame and current data in the memory includes: obtaining a compensation value of the (N+1)$^{th}$ frame according to the grayscale data of the (N+1)$^{th}$ frame and the current data in the memory and according to a grayscale compensation LUT. It should be noted that the grayscale compensation LUT is different from the weight LUT.

The embodiments of the present disclosure are described below according to FIG. 5 in conjunction with examples. A current frame is the (N+1)$^{th}$ frame. That is, each of the grayscale data of the (N−1)$^{th}$ frame and the grayscale data of the N$^{th}$ frame, after being compensated, is output to the OLED display panel. Prior to the compensation for the (N+1)$^{th}$ frame, the DBV of the OLED display panel is determined first. If the current DBV is greater than the brightness threshold P, it indicates that there is no need to correct and compensate multiple frames after scenario switching, and only the first frame after scenario switching needs to be compensated in an existing manner. Therefore, uncorrected grayscale data of the N$^{th}$ frame may be directly stored into the memory. Prior to driving the display panel according to the grayscale data of the (N+1)$^{th}$ frame, a grayscale compensation value of the (N+1)$^{th}$ frame is obtained according to the grayscale data of the N$^{th}$ frame in the memory and the grayscale data of the (N+1)$^{th}$ frame and according to the grayscale compensation LUT. Finally, a superimposition result of the grayscale data of the (N+1)$^{th}$ frame and the grayscale compensation value of the (N+1)$^{th}$ frame is output to the display panel. If the current DBV is not greater than P, it indicates that there is a need to correct and compensate multiple frames after the scenario switching. Then, G is calculated according to the grayscale data of the N$^{th}$ frame and the grayscale data of the (N−1)$^{th}$ frame in the memory. If G is not greater than 0, it indicates that no compensation is required for a next frame. Therefore, uncorrected grayscale data of the N$^{th}$ frame can be directly stored into the memory, and the grayscale compensation value of the (N+1)$^{th}$ frame is set to 0. Finally, superimposition of the grayscale data of the (N+1)$^{th}$ frame and 0 is output to the display panel. If G is greater than 0, the grayscale data of the N$^{th}$ frame is corrected, and the corrected grayscale data of the N$^{th}$ frame is stored into the memory. For the grayscale data of the (N+1)$^{th}$ frame, a grayscale compensation value of the (N+1)$^{th}$ frame is determined according to corrected grayscale data of the N$^{th}$ frame in the memory and the grayscale data of the (N+1)$^{th}$ frame and according to the grayscale compensation LUT. Finally, a superimposition result of the grayscale data of the (N+1)$^{th}$ frame and the grayscale compensation value of the (N+1)$^{th}$ frame is output to the display panel.

Figure 6:
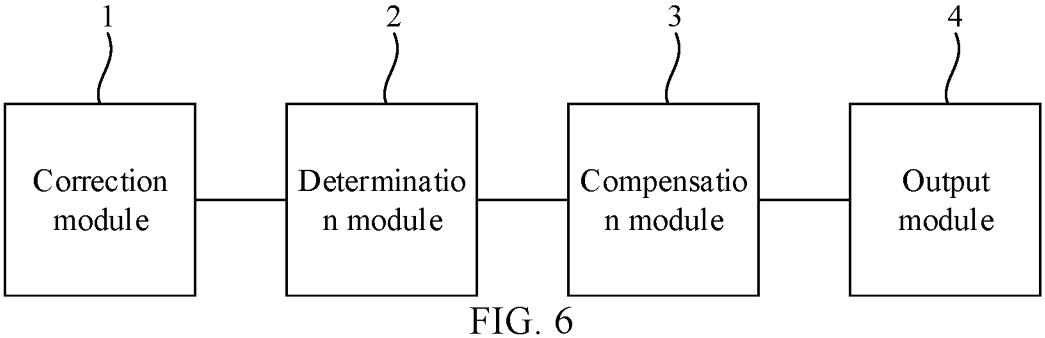
FIG. 6 is a structural block diagram of a driving apparatus for an OLED display panel according to an embodiment of the present disclosure.

As shown in FIG. 6, an embodiment of the present disclosure further provides a driving apparatus for an OLED display panel. The driving apparatus includes: a correction module 1 configured to correct, if a current DBV of the OLED display panel is below a brightness threshold, grayscale data of an N$^{th}$ frame to obtain corrected grayscale data of the N$^{th}$ frame; a determination module 2 configured to obtain a compensation value of an (N+1)$^{th}$ frame according to grayscale data of the (N+1)$^{th}$ frame and the corrected grayscale data of the N$^{th}$ frame; a compensation module 3 configured to perform compensation according to the compensation value of the (N+1)$^{th}$ frame and the grayscale data of the (N+1)$^{th}$ frame to obtain compensated grayscale data of the (N+1)$^{th}$ frame; and an output module 4 configured to output the compensated grayscale data of the (N+1)$^{th}$ frame to the OLED display panel.

The driving apparatus for an OLED display panel can be applied to the driving method for an OLED display panel in any of the above embodiments, and the processes and principles thereof are the same as those in the above embodiments. Details will not be described herein again.

It should be understood that the above division of the driving apparatus for an OLED display panel is merely division in terms of logical functions, which may be wholly or partially integrated onto a physical entity or be physically separated in actual implementation. Moreover, all these modules may be implemented in a form of software invoked by a processing element, or may be implemented in a form of hardware; or some modules may be implemented in a form of software invoked by a processing element, and some modules may be implemented in a form of hardware. For example, any one of the correction module 1, the determination module 2, the compensation module 3, and the output module 4 may be an independent processing element, or may be integrated onto the driving apparatus for an OLED display panel, for example, integrated onto a chip of the driving apparatus for an OLED display panel for implementation. In addition, the module(s) may be stored, in the form of a program, in a memory in the driving apparatus for an OLED display panel, and be invoked by a processing element in the driving apparatus for an OLED display panel, to perform the functions of the above modules. Implementation of other module(s) is similar thereto. In addition, all or some of the modules may be integrated together or may be implemented separately. The processing element herein may be an integrated circuit with a signal processing capability. In an implementation process, steps of the above method or the above modules may be implemented by using an integrated logical circuit of hardware in the processer element, or by using an instruction in a form of software.

For example, the correction module 1, the determination module 2, the compensation module 3, and the output module 4 may be configured as one or more integrated circuits for implementing the above methods, such as one or more application-specific integrated circuits (ASICs), or one or more microprocessors (digital signal processors (DSPs), or one or more field programmable gate arrays (FPGAs). In another example, when one of the above modules is implemented by a processing element by invoking a program, the processing element may be a general-purpose processor, for example, a central processing unit (CPU) or another processor that can invoke the program. In another example, these modules may be integrated together and implemented in a form of a system-on-a-chip (SOC).

In an embodiment, the process of correcting grayscale data of an $N^{th}$ frame to obtain corrected grayscale data of the $N^{th}$ frame includes: correcting data of the $N^{th}$ frame according to grayscale data of an $(N-1)^{th}$ frame to obtain the corrected grayscale data of the $N^{th}$ frame.

In an embodiment, the process of correcting data of the $N^{th}$ frame according to grayscale data of an $(N-1)^{th}$ frame to obtain the corrected grayscale data of the $N^{th}$ frame includes: correcting the grayscale data of the $N^{th}$ frame according to the grayscale data of the $(N-1)^{th}$ frame and the current DBV to obtain the corrected grayscale data of the $N^{th}$ frame.

In an embodiment, the process of correcting the grayscale data of the $N^{th}$ frame according to the grayscale data of the $(N-1)^{th}$ frame and the current DBV to obtain the corrected grayscale data of the $N^{th}$ frame includes: correcting the grayscale data of the $N^{th}$ frame according to the following formula to obtain the corrected grayscale data of the $N^{th}$ frame: $NewData_N=a*Data_{N-1}+(1-a)*Data_N$, where $Data_{N-1}$ denotes the grayscale data of the $(N-1)^{th}$ frame, $Data_N$ denotes the grayscale data of the $N^{th}$ frame, $NewData_N$ denotes the corrected grayscale data of the $N^{th}$ frame, a denotes a current weight value, a is correlated with G, $G=Data_N-Data_{N-1}$, $0\leq a\leq 1$, and a is correlated with the current DBV.

In an embodiment, a is determined according to a weight LUT. The weight LUT includes weight values arranged in rows and columns, the weight LUT further including G binding points and DBV binding points. The G binding points correspond to the rows of weight values, respectively; and the DBV binding points correspond to the columns of weight values, respectively.

In an embodiment, the process of correcting, if a current DBV is below a brightness threshold, grayscale data of an $N^{th}$ frame to obtain corrected grayscale data of the $N^{th}$ frame includes: correcting, if the current DBV is below the brightness threshold and G>0, the grayscale data of the $N^{th}$ frame to obtain the corrected grayscale data of the $N^{th}$ frame, $G=Data_N-Data_{N-1}$, where $Data_{N-1}$ denotes the grayscale data of the $(N-1)^{th}$ frame, and $Data_N$ denotes the grayscale data of the $N^{th}$ frame.

In an embodiment, the process of correcting, if a current DBV is below a brightness threshold, grayscale data of an $N^{th}$ frame to obtain corrected grayscale data of the $N^{th}$ frame further includes: outputting, if the current DBV is below the brightness threshold and G≤0, uncompensated grayscale data of the $(N+1)^{th}$ frame to the OLED display panel.

In an embodiment, the compensation module 3 is further configured to, prior to performing compensation according to the compensation value of the $(N+1)^{th}$ frame and the grayscale data of the $(N+1)^{th}$ frame, obtain the compensation value of the $(N+1)^{th}$ frame according to the grayscale data of the $(N+1)^{th}$ frame and uncorrected grayscale data of the $N^{th}$ frame if the current DBV is not below the brightness threshold.

In an embodiment, the grayscale data of the $(N-1)^{th}$ frame is from a memory. Prior to the process of obtaining a compensation value of an $(N+1)^{th}$ frame according to grayscale data of the $(N+1)^{th}$ frame and the corrected grayscale data of the $N^{th}$ frame, the correction module 1 is further configured to store, if the current DBV is below the brightness threshold and G>0, the corrected grayscale data of the $N^{th}$ frame into the memory to replace the grayscale data of the $(N-1)^{th}$ frame therein, $G=Data_N-Data_{N-1}$, where $Data_{N-1}$ denotes the grayscale data of the $(N-1)^{th}$ frame, and $Data_N$ denotes the grayscale data of the $N^{th}$ frame.

In an embodiment, the process of outputting, if the current DBV is below the brightness threshold and G≤0, uncompensated grayscale data of the $(N+1)^{th}$ frame to the OLED display panel includes: storing, if the current DBV is below the brightness threshold and G≤0, the uncorrected grayscale data of the $N^{th}$ frame into the memory to replace the grayscale data of the $(N-1)^{th}$ frame therein, and outputting the uncompensated grayscale data of the $(N+1)^{th}$ frame to the OLED display panel.

In an embodiment, prior to the process of obtaining a compensation value of an $(N+1)^{th}$ frame according to grayscale data of the $(N+1)^{th}$ frame and the corrected grayscale data of the $N^{th}$ frame, the correction module 1 is further configured to store, if the current DBV is not below the brightness threshold, the uncorrected grayscale data of the $N^{th}$ frame into the memory to replace the grayscale data of the $(N-1)^{th}$ frame therein.

In an embodiment, the process of obtaining a compensation value of an $(N+1)^{th}$ frame according to grayscale data of the $(N+1)^{th}$ frame and the corrected grayscale data of the $N^{th}$ frame includes: obtaining a compensation value of the $(N+1)^{th}$ frame according to the grayscale data of the $(N+1)^{th}$ frame and current data in the memory.

In an embodiment, the process of obtaining a compensation value of the $(N+1)^{th}$ frame according to the grayscale data of the $(N+1)^{th}$ frame and current data in the memory includes: obtaining a compensation value of the $(N+1)^{th}$ frame according to the grayscale data of the $(N+1)^{th}$ frame and the current data in the memory and according to a grayscale compensation LUT.

Figure 7:
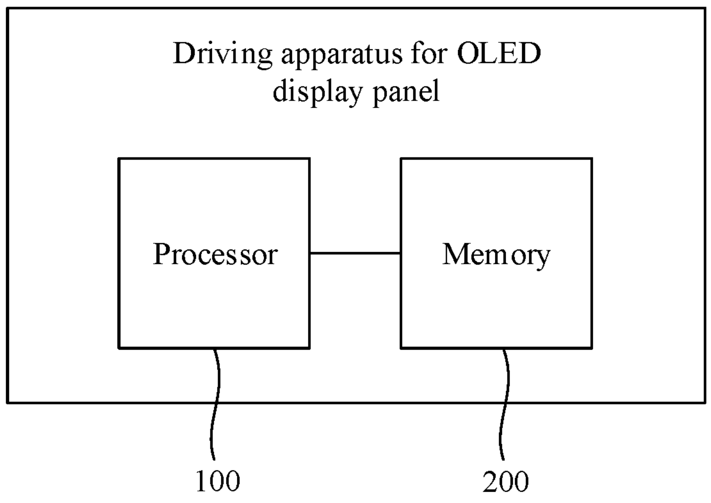
FIG. 7 is a structural block diagram of another driving apparatus for an OLED display panel according to an embodiment of the present disclosure.

As shown in FIG. 7, an embodiment of the present disclosure further provides a driving apparatus for an OLED display panel, and the driving apparatus includes: a processor 100 and a memory 200. The memory 200 is configured to store at least one instruction. The instruction is loaded and executed by the processor 100 to implement the method in any of the above embodiments.

The processor 100 may include one or more processing units. Different processing units may be separate devices, or may be integrated onto one or more processors. The memory 200 may be configured to store computer-executable program codes. The executable program codes include instructions. The memory may include a program storage area and a data storage area. In addition, the internal memory 200 may include a high-speed RAM, and may further include a nonvolatile memory, such as at least one magnetic disk storage device, a flash memory, or a universal flash storage (UFS). The processor 100 runs the instructions stored in the memory 200 to perform various function applications and data processing of an electronic device. The driving apparatus for an OLED display panel may be a driving chip for an OLED display panel.

An embodiment of the present disclosure further provides an electronic device, including: an OLED display panel and the driving apparatus for an OLED display panel described above. An operation process and principle of the driving apparatus for an OLED display panel are not further described herein.

The electronic device may be any device with a display function, such as a mobile phone, a tablet computer, a personal computer (PC), a wearable electronic device, on-board equipment, or a vehicle.

An embodiment of the present disclosure further provides a computer storage medium, including computer instructions. The computer instructions, when run in an electronic device, cause the electronic device to perform the method in any of the above embodiments.

The above embodiments may be wholly or partially implemented by software, hardware, firmware, or any combination thereof. When implemented by software, the above embodiments may be wholly or partially implemented in a form of a computer program product. The computer program product includes one or more computer instructions. When the computer program instructions are loaded and executed on the computer, the procedures or functions according to the present disclosure are all or partially generated. The computer may be a general-purpose computer, a dedicated computer, a computer network, or other programmable apparatuses. The computer instructions may be stored in a computer-readable storage medium, or may be transmitted from one computer-readable storage medium to another computer-readable storage medium. For example, the computer instructions may be transmitted from a web site, computer, server, or data center to another web site, computer, server, or data center in a wired manner (for example, a coaxial cable, an optical fiber, or a digital subscriber line) or wireless manner (for example, infrared, radio, or microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive (SSD)), or the like.

In the embodiments of the present disclosure, "at least one" means one or more, and "a plurality of/multiple" means two or more. "And/or" is an association relationship describing associated objects, indicating that three relationships may exist. For example, A and/or B indicates that there are the following three cases: A alone, A and B together, and B alone. Here, A and B may be singular or plural. The character "/" generally indicates an "or" relationship between the associated objects. "At least one of the following items" or a similar expression thereof indicates any combination of these items, including a single item or any combination of items. For example, at least one of a, b, or c may indicate a, b, c; a and b; a and c; b and c; or a, b, and c, where a, b, and c may be singular or plural.

The above are merely preferred embodiments of the present disclosure and are not intended to limit the present disclosure. For those skilled in the art, the present disclosure may have various modifications and variations. Any modifications, equivalent substitutions, improvements and the like made within a principle of the present disclosure shall fall within a protection scope of the present disclosure.

What is claimed is:

1. A driving method for an organic light-emitting diode (OLED) display panel, the driving method comprising:

correcting, when a current display brightness value (DBV) of the OLED display panel is below a brightness threshold, grayscale data of an $N^{th}$ frame to obtain corrected grayscale data of the $N^{th}$ frame, wherein N represents a natural number≤2, and wherein said correcting grayscale data of the $N^{th}$ frame to obtain corrected grayscale data of the $N^{th}$ frame comprises:

correcting data of the $N^{th}$ frame according to grayscale data of an $(N-1)^{th}$ frame to obtain corrected grayscale data of the $N^{th}$ frame, wherein said correcting data of the $N^{th}$ frame according to grayscale data of the $(N-1)^{th}$ frame to obtain corrected grayscale data of the $N^{th}$ frame comprises:

correcting the grayscale data of the $N^{th}$ frame according to grayscale data of the $(N-1)^{th}$ frame and the current DBV to obtain corrected grayscale data of the $N^{th}$ frame, wherein said correcting the grayscale data of the $N^{th}$ frame according to grayscale data of the $(N-1)^{th}$ frame and the current DBV to obtain corrected grayscale data of the $N^{th}$ frame comprises:

correcting the grayscale data of the $N^{th}$ frame according to a following formula to obtain corrected grayscale data of the $N^{th}$ frame:

$$NewData_N = a*Data_{N-1} + (1-a)*Data_N,$$

where $Data_{N-1}$ denotes grayscale data of the $(N-1)^{th}$ frame, $Data_N$ denotes the grayscale data of the $N^{th}$ frame, $NewData_N$ denotes the corrected grayscale data of the $N^{th}$ frame, and a denotes a current weight value, wherein a is correlated with G. $G=Data_N-Data_{N-1}$, $0 \le a \le 1$, and a is correlated with the current DBV:

obtaining a compensation value of an $(N+1)^{th}$ frame according to grayscale data of the $(N+1)^{th}$ frame and the corrected grayscale data of the $N^{th}$ frame;

performing compensation according to the compensation value of the $(N+1)^{th}$ frame and the grayscale data of the $(N+1)^{th}$ frame to obtain compensated grayscale data of the $(N+1)^{th}$ frame; and outputting the compensated grayscale data of the $(N+1)^{th}$ frame to the OLED display panel.

2. The driving method according to claim 1, wherein a is determined according to a weight look up table (LUT); and wherein the weight LUT comprises weight values arranged in rows and columns, and further comprises G binding points and DBV binding points, wherein the G binding points correspond to the rows of the weight values, respectively, and the DBV binding points correspond to the columns of the weight values, respectively.

3. A driving method for an organic light-emitting diode (OLED) display panel, the driving method comprising:

correcting, when a current display brightness value (DBV) of the OLED display panel is below a brightness threshold, grayscale data of an $N^{th}$ frame to obtain corrected grayscale data of the $N^{th}$ frame, wherein N represents a natural number≥2, and wherein said correcting, when a current DBV is below the brightness threshold, grayscale data of the $N^{th}$ frame to obtain corrected grayscale data of the $N^{th}$ frame comprises:

correcting, when a current DBV is below the brightness threshold and G>0, grayscale data of the $N^{th}$ frame to obtain corrected grayscale data of the $N^{th}$ frame, wherein $G=Data_N-Data_{N-1}$, where $Data_{N-1}$ denotes grayscale data of an $(N-1)^{th}$ frame, and $Data_N$ denotes the grayscale data of the $N^{th}$ frame;

obtaining a compensation value of an $(N+1)^{th}$ frame according to grayscale data of the $(N+1)^{th}$ frame and the corrected grayscale data of the $N^{th}$ frame;

performing compensation according to the compensation value of the $(N+1)^{th}$ frame and the grayscale data of the $(N+1)^{th}$ frame to obtain compensated grayscale data of the $(N+1)^{th}$ frame; and outputting the compensated grayscale data of the $(N+1)^{th}$ frame to the OLED display panel.

4. The driving method according to claim 3, wherein said correcting, when the current DBV is below the brightness threshold, grayscale data of the $N^{th}$ frame to obtain corrected grayscale data of the $N^{th}$ frame further comprises:

outputting, when the current DBV is below the brightness threshold and G≤0, uncompensated grayscale data of the $(N+1)^{th}$ frame to the OLED display panel.

5. The driving method according to claim 3, wherein, prior to said performing compensation according to the compensation value of the $(N+1)^{th}$ frame and the grayscale data of the $(N+1)^{th}$ frame, the driving method comprises:

obtaining, when the current DBV is not below the brightness threshold, the compensation value of the $(N+1)^{th}$ frame according to the grayscale data of the $(N+1)^{th}$ frame and uncorrected grayscale data of the $N^{th}$ frame.

6. The driving method according to claim 3, wherein grayscale data of the $(N-1)^{th}$ frame is from memory; and wherein, prior to said obtaining the compensation value of an $(N+1)^{th}$ frame according to grayscale data of the $(N+1)^{th}$ frame and the corrected grayscale data of the $N^{th}$ frame, the driving method comprises:

storing, when the current DBV is below the brightness threshold and G>0, the corrected grayscale data of the $N^{th}$ frame into the memory to replace the grayscale data of the $(N-1)^{th}$ frame therein, wherein $G=Data_N-Data_{N-1}$, where $Data_{N-1}$ denotes the grayscale data of the $(N-1)^{th}$ frame, and $Data_N$ denotes the grayscale data of the $N^{th}$ frame.

7. The driving method according to claim 6, further comprising:

outputting, when the current DBV is below the brightness threshold and G≤0, uncompensated grayscale data of the $(N+1)^{th}$ frame to the OLED display panel;

wherein said outputting, when the current DBV is below the brightness threshold and G≤0, uncompensated grayscale data of the $(N+1)^{th}$ frame to the OLED display panel comprises:

storing, when the current DBV is below the brightness threshold and G≤0, uncorrected grayscale data of the $N^{th}$ frame into the memory to replace grayscale data of the $(N-1)^{th}$ frame therein, and outputting uncompensated grayscale data of the $(N+1)^{th}$ frame to the OLED display panel.

8. The driving method according to claim 6, wherein, prior to said obtaining the compensation value of an $(N+1)^{th}$ frame according to grayscale data of the $(N+1)^{th}$ frame and the corrected grayscale data of the $N^{th}$ frame, the driving method further comprises:

storing, when the current DBV is not below the brightness threshold, uncorrected grayscale data of the $N^{th}$ frame into the memory to replace grayscale data of the $(N-1)^{th}$ frame therein.

9. The driving method according to claim 7, wherein said obtaining the compensation value of an $(N+1)^{th}$ frame according to grayscale data of the $(N+1)^{th}$ frame and the corrected grayscale data of the $N^{th}$ frame comprises:

obtaining the compensation value of an $(N+1)^{th}$ frame according to grayscale data of the $(N+1)^{th}$ frame and current data in the memory.

10. The driving method according to claim 8, wherein said obtaining the compensation value of an $(N+1)^{th}$ frame according to grayscale data of the $(N+1)^{th}$ frame and the corrected grayscale data of the $N^{th}$ frame comprises:

obtaining the compensation value of an $(N+1)^{th}$ frame according to grayscale data of the $(N+1)^{th}$ frame and current data in the memory.

11. The driving method according to claim 7, wherein said obtaining the compensation value of an $(N+1)^{th}$ frame according to grayscale data of the $(N+1)^{th}$ frame and the corrected grayscale data of the $N^{th}$ frame comprises:

obtaining the compensation value of an $(N+1)^{th}$ frame according to grayscale data of the $(N+1)^{th}$ frame and current data in the memory and according to a grayscale compensation LUT.

12. The driving method according to claim 8, wherein said obtaining the compensation value of an $(N+1)^{th}$ frame according to grayscale data of the $(N+1)^{th}$ frame and the corrected grayscale data of the $N^{th}$ frame comprises:

obtaining the compensation value of an $(N+1)^{th}$ frame according to grayscale data of the $(N+1)^{th}$ frame and current data in the memory and according to a grayscale compensation LUT.

13. A driving apparatus for an organic light-emitting diode (OLED) display panel, the driving apparatus comprising: a correction module configured to correct, when a current display brightness value (DBV) of the OLED display panel is below a brightness threshold, grayscale data of an $N^{th}$ frame to obtain corrected grayscale data of the $N^{th}$ frame, wherein N represents a natural number>$2_2$ and wherein said correcting, when a current DBV is below the brightness threshold, grayscale data of the Nth frame to obtain corrected grayscale data of the $N^{th}$ frame comprises:

correcting, when a current DBV is below the brightness threshold and G>0, grayscale data of the $N^{th}$ frame to obtain corrected grayscale data of the $N^{th}$ frame, wherein $G=Data_N-Data_{N-1}$, where $Data_{N-1}$ denotes grayscale data of an $(N-1)^{th}$ frame, and $Data_N$ denotes the grayscale data of the $N^{th}$ frame;

a determination module configured to obtain a compensation value of an $(N+1)^{th}$ frame according to grayscale data of the $(N+1)^{th}$ frame and the corrected grayscale data of the $N^{th}$ frame;

a compensation module configured to perform compensation according to the compensation value of the $(N+1)^{th}$ frame and the grayscale data of the $(N+1)^{th}$ frame to obtain compensated grayscale data of the (N+1) frame; and an output module configured to output the compensated grayscale data of the (N+1) frame to the OLED display panel.

14. An electronic device, comprising: a driving apparatus for an organic light-emitting diode (OLED) display panel and the OLED display panel, the apparatus comprising:

a processor; and a memory configured to store at least one instruction loaded and executed by the processor to implement a driving method for the OLED display panel, the driving method comprising:

correcting, when a current display brightness value (DBV) of the OLED display panel is below a brightness threshold, grayscale data of an $N^{th}$ frame to obtain corrected grayscale data of the $N^{th}$ frame, wherein N represents a natural number>2, and wherein said correcting, when a current DBV is below the brightness threshold, a grayscale data of the $N^{th}$ frame to obtain corrected grayscale data of the $N^{th}$ frame comprises:

correcting, when a current DBV is below the brightness threshold and G>0, grayscale data of the $N^{th}$ frame to obtain corrected grayscale data of the $N^{th}$ frame, wherein $G=Data_N-Data_{N-1}$, where $Data_{N-1}$ denotes grayscale data of an $(N-1)^{th}$ frame, and $Data_N$ denotes the grayscale data of the $N^{th}$ frame;

obtaining a compensation value of an $(N+1)^{th}$ frame according to grayscale data of the $(N+1)^{th}$ frame and the corrected grayscale data of the $N^{th}$ frame;

performing compensation according to the compensation value of the $(N+1)^{th}$ frame and the grayscale data of the $(N+1)^{th}$ frame to obtain compensated grayscale data of the $(N+1)^{th}$ frame; and outputting the compensated grayscale data of the (N+1) frame to the OLED display panel.

* * * * *